United States Patent
Uehara (10) Patent No.: US 11,841,062 B2
(45) Date of Patent: Dec. 12, 2023

(54) DAMPER DEVICE (71) Applicant: EXEDY Corporation, Neyagawa (JP)

(72) Inventor: Hiroshi Uehara, Neyagawa (JP)

(73) Assignee: EXEDY Corporation

( * ) Notice: Subject to any disclaimer, the term of this patent is extended or adjusted under 35 U.S.C. 154(b) by 327 days.

(21) Appl. No.: 17/369,174

(22) Filed: Jul. 7, 2021

(65) Prior Publication Data

US 2022/0042550 A1   Feb. 10, 2022

(30) Foreign Application Priority Data

Aug. 7, 2020 (JP) .................................. 2020-134864

(51) Int. Cl.
*F16F 15/123* (2006.01)
(52) U.S. Cl.
CPC .............................. *F16F 15/12373* (2013.01)
(58) Field of Classification Search
CPC ............... F16F 15/123; F16F 15/12306; F16F 15/12353; F16F 15/1236; F16F 15/12366; F16F 15/12373; F16F 15/134; F16F 15/13407; F16F 15/13469; F16F 15/13476; F16F 15/13484; F16F 15/13492; F16F 2228/066
See application file for complete search history.

(56) References Cited

U.S. PATENT DOCUMENTS

| | | | | |
|---|---|---|---|---|
| 6,461,243 B1 * | 10/2002 | Uehara | ............. | F16F 15/12326 |
| | | | | 192/205 |
| 7,192,354 B2 * | 3/2007 | Uehara | ............... | F16F 15/1292 |
| | | | | 464/68.4 |
| 7,942,749 B2 * | 5/2011 | Uehara | ............. | F16F 15/13484 |
| | | | | 464/68.8 |
| 8,641,537 B2 * | 2/2014 | Uehara | ............. | F16F 15/13469 |
| | | | | 464/68.92 |
| 10,302,170 B2 * | 5/2019 | Ito | ..................... | F16F 15/12366 |
| 11,674,553 B2 * | 6/2023 | Bagard | ............. | F16F 15/12366 |
| | | | | 464/68.1 |

FOREIGN PATENT DOCUMENTS

| | | | | |
|---|---|---|---|---|
| DE | 102015201962 A1 * | 9/2015 | ............ | F16F 15/134 |
| JP | 2001-304341 A | 10/2001 | | |
| JP | 2005-106143 A | 4/2005 | | |
| WO | WO-2006050687 A1 * | 5/2006 | ........ | F16F 15/12353 |

* cited by examiner

*Primary Examiner* — Josh Skroupa
(74) *Attorney, Agent, or Firm* — United IP Counselors, LLC (57) ABSTRACT

A damper device includes first and second rotors, and an elastic coupling part elastically coupling the two rotors. The elastic coupling part includes first and second elastic members initially disposed in a compressed state in a neutral condition without relative rotation between the two rotors. The first elastic member is transitioned from the compressed state to a free state and then further compressed when torsion of the first rotor with respect to the second rotor is caused from the neutral condition to a first side. The second elastic member is transitioned from the compressed state to the free state and then further compressed when the torsion of the first rotor with respect to the second rotor is caused from the neutral condition to a second side. Each of the first and second elastic members is transitioned from a one-side contact state to a both-side contact state when actuated in compressed.

11 Claims, 7 Drawing Sheets

DAMPER DEVICE

CROSS-REFERENCE TO RELATED APPLICATIONS

This application claims priority to Japanese Patent Application No. 2020-134864, filed Aug. 7, 2020. The entire contents of that application are incorporated by reference herein in their entirety.

TECHNICAL FIELD

The present invention relates to a damper device.

BACKGROUND ART

In general, noises and vibrations of vehicles include noises in idling, noises in traveling, and tip-in/tip-out (low frequency vibrations). Damper devices are provided for inhibiting the noises and vibrations described above.

In torsional characteristics of a damper device, a low torsion angular range relates to noises in idling, and a low torsional stiffness is preferable in the low torsion angular range. On the other hand, to countermeasure tip-in/tip-out, the torsional characteristics are required to have a highest possible stiffness.

In view of this, there have been proposed damper devices having multistage torsional characteristics as described in Japan Laid-open Patent Application Publications Nos. 2001-304341 and 2005-106143. The devices described in the publications are configured to suppress low the torsional stiffness in the first stage (low torsion angular range) of the torsional characteristics so as to inhibit noises in idling. Besides, the devices are configured to set the torsional stiffness to be high in the second stage (high torsion angular range) of the torsional characteristics so as to attenuate tip-in/tip-out vibrations.

In the damper devices described in the publications, a spline hub, provided as an output-side member, is divided into a hub having a tubular shape and a flange provided on the outer peripheral side of the hub, and a sub-damper unit is provided between the divided hub and flange.

In such a well-known multistage damper device as described above, increase in number of components is inevitable, whereby compactness in size of the device is hindered.

BRIEF SUMMARY

It is an object of the present invention to enable a damper device to have multistage torsional characteristics with a simple configuration.

(1) A damper device according to the present invention includes a first rotor rotated about a rotational axis, a second rotor rotated about the rotational axis, and an elastic coupling part. The second rotor is disposed to be rotatable relative to the first rotor. The elastic coupling part elastically couples the first rotor and the second rotor in a rotational direction and includes a first elastic member and a second elastic member that are each initially disposed in a compressed state in a neutral condition without torsion caused by relative rotation between the first rotor and the second rotor.

The first elastic member transitions from the compressed state to a free state and is then further compressed when the torsion of the first rotor with respect to the second rotor is caused from the neutral condition to a first side in the rotational direction. On the other hand, the second elastic member transitions from the compressed state to a free state and is then further compressed when the torsion of the first rotor with respect to the second rotor is caused from the neutral condition to a second side in the rotational direction. Furthermore, the first and second elastic members each transition from a one-side contact state to a both-side contact state on either or both circumferential end surfaces thereof when actuated in compression.

It should be noted that the term "free state" herein refers to a state of each elastic member that has a free length without being compressed or extended. Besides, the term "one-side contact state" means a state that either or both circumferential end surfaces of each elastic member make contact only at a radially inner or outer part thereof with the first rotor and/or the second rotor. On the other hand, the term "both-side contact state" means a state that either or both circumferential end surfaces of each elastic member make contact at both radially inner and outer parts thereof with the first rotor and/or the second rotor.

In the present damper device, in the neutral condition, the first and second rotors receive both a torsional torque acting to the first side in the rotational direction and a torsional torque acting to the second side in the rotational direction from the first and second elastic members each disposed in the compressed state. In other words, the torsional torque applied by the first elastic member and that applied by the second elastic member are oriented opposite to each other in the neutral condition. Therefore, in a torsional characteristic diagram, torsional characteristics exerted by the respective elastic members are displaced from each other in the vertical direction (torque direction).

Besides, when actuated in compression, the first and second elastic members each transition from the one-side contact state to the both-side contact state on either or both end surfaces thereof. When each elastic member is compressed in the one-side contact state, torsional stiffness thereof is relatively low. Then, when each elastic member transitions from the one-side contact state to the both-side contact state, the torsional stiffness thereof changes from low to high. Therefore, when each elastic member is shifted in timing of transition from the one-side contact state to the both-side contact state, a bending point (at which the torsional stiffness changes) of the torsional characteristics is configured to be shifted in the horizontal direction (torsion angular direction) in the torsional characteristic diagram.

By appropriately setting such displacement as described above, i.e., displacement in both the torque direction and the torsion angular direction between the torsional characteristics of the first and second elastic members, net torsional characteristics of the first and second elastic members can be obtained in a two-stage or three-stage form. Because of this, the damper device is enabled to exert multistage torsional characteristics with a simple configuration.

Furthermore, in the present damper device, in the neutral condition, the first and second rotors receive the torsional torque acting to the first side in the rotational direction and the torsional torque acting to the second side in the rotational direction from the first and second elastic members each disposed in the compressed state. Therefore, even in fluctuations in input torque less than or equal to the torsional torque generated by the compressed elastic member, an angle of torsion (relative rotation) between the first and second rotors can be made as small as possible. Because of this, it is possible to inhibit collision sound produced between respective members due to torque fluctuations in a predetermined torsion angular range.

(2) Preferably, the first elastic member is further compressed from the compressed state when the torsion of the first rotor with respect to the second rotor is caused from the neutral condition to the second side in the rotational direction. On the other hand, the second elastic member is further compressed from the compressed state when the torsion of the first rotor with respect to the second rotor is caused from the neutral condition to the first side in the rotational direction.

(3) Preferably, the first and second elastic members are equal in stiffness.

(4) Preferably, the first rotor includes a first support portion and a second support portion. Besides, the second rotor includes a first accommodation portion and a second accommodation portion. The first accommodation portion is disposed to overlap in part the first support portion and be offset from the first support portion to the first side in the rotational direction as seen in an axial direction. The second accommodation portion is disposed to overlap in part the second support portion and be offset from the second support portion to the second side in the rotational direction as seen in the axial direction. Furthermore, in this case, the first elastic member is disposed in the first support portion and the first accommodation portion. On the other hand, the second elastic member is disposed in the second support portion and the second accommodation portion and is actuated in parallel with the first elastic member.

(5) Preferably, the first and second support portions each include a first support surface on one end thereof located on the first side in the rotational direction and each include a second support surface on the other end thereof located on the second side in the rotational direction. Besides, the first and second accommodation portions each include a first accommodation surface on one end thereof located on the first side in the rotational direction and each include a second accommodation surface on the other end thereof located on the second side in the rotational direction. In this case, the first elastic member is disposed in the compressed state between the first support surface and the second accommodation surface. On the other hand, the second elastic member is disposed in the compressed state between the first accommodation surface and the second support surface. Furthermore, preferably, at least one of the first support surface and the first accommodation surface and at least one of the second support surface and the second accommodation surface slant to open radially outward.

By making at least one of the support surface and the accommodation surface (between which each elastic member is disposed) slant to open radially outward, each elastic member is enabled to transition from the one-side contact state to the both-side contact state when actuated in compression.

(6) Preferably, the elastic coupling part further includes a third elastic member and a fourth elastic member. The third and fourth elastic members are each initially disposed in a compressed state in the neutral condition. Besides, the third elastic member transitions from the compressed state to a free state and is then further compressed when the torsion of the first rotor with respect to the second rotor is caused from the neutral condition to the first side in the rotational direction. The fourth elastic member transitions from the compressed state to a free state and is then further compressed when the torsion of the first rotor with respect to the second rotor is caused from the neutral condition to the second side in the rotational direction. Furthermore, the third and fourth elastic members each transition from a one-side contact state to a both-side contact state on either or both circumferential end surfaces thereof when actuated in compression.

(7) Preferably, the first rotor further includes a third support portion and a fourth support portion. The third support portion is opposed to the first support portion with respect to the rotational axis. The fourth support portion is opposed to the second support portion with respect to the rotational axis. Besides, preferably, the second rotor further includes a third accommodation portion and a fourth accommodation portion. The third accommodation portion is opposed to the first accommodation portion with respect to the rotational axis. The fourth accommodation portion is opposed to the second accommodation portion with respect to the rotational axis. Moreover, the third accommodation portion is disposed to overlap in part the third support portion and be offset from the third support portion to the first side in the rotational direction as seen in the axial direction. The fourth accommodation portion is disposed to overlap in part the fourth support portion and be offset from the fourth support portion to the second side in the rotational direction as seen in the axial direction.

Furthermore in this case, the third elastic member is disposed in the third support portion and the third accommodation portion. On the other hand, the fourth elastic member is disposed in the fourth support portion and the fourth accommodation portion and is actuated in parallel with the third elastic member.

(8) Preferably, the third and fourth support portions each include a third support surface on one end thereof located on the first side in the rotational direction and each include a fourth support surface on the other end thereof located on the second side in the rotational direction. Besides, the third and fourth accommodation portions each include a third accommodation surface on one end thereof located on the first side in the rotational direction and each include a fourth accommodation surface on the other end thereof located on the second side in the rotational direction. In this case, the third elastic member is disposed in the compressed state between the third support surface and the fourth accommodation surface. On the other hand, the fourth elastic member is disposed in the compressed state between the third accommodation surface and the fourth support surface. Furthermore, at least one of the third support surface and the third accommodation surface and at least one of the fourth support surface and the fourth accommodation surface slant to open radially outward.

(9) Preferably, the first accommodation portion is disposed to be offset from the first support portion to the first side in the rotational direction by a predetermined angle, while the second accommodation portion is disposed to be offset from the second support portion to the second side in the rotational direction by the predetermined angle. In this case, the first and second elastic members are each in the one-side contact state in a first torsion angular range. Besides, the first elastic member is in the one-side contact state and the second elastic member is in the both-side contact state in a second torsion angular range greater than the first torsion angular range. Furthermore, the first and second elastic members are each in the both-side contact state in a third torsion angular range exceeding the second torsion angular range.

(10) Preferably, the first accommodation portion is disposed to be offset from the first support portion to the first side in the rotational direction by a predetermined angle, while the second accommodation portion is disposed to be offset from the second support portion to the second side in the rotational direction by the predetermined angle. In this case, the first elastic member is in the one-side contact state and the second elastic member is in the both-side contact state in a first torsion angular range. Besides, the first and second elastic members are each in the both-side contact state in a second torsion angular range exceeding the first torsion angular range.

(11) Preferably, the first accommodation portion is disposed to be offset from the first support portion to the first side in the rotational direction by a predetermined angle, while the second accommodation portion is disposed to be offset from the second support portion to the second side in the rotational direction by the predetermined angle. In this case, the first and second elastic members are each in the both-side contact state in a first torsion angular range. Besides, the first elastic member is in the one-side contact state and the second elastic member is in the both-side contact state in a second torsion angular range greater than the first torsion angular range. Furthermore, the first and second elastic members are each in the both-side contact state in a third torsion angular range exceeding the second torsion angular range.

Overall, according to the present invention described above, a damper device is enabled to exert multistage torsional characteristics with a simple configuration.

DETAILED DESCRIPTION

First Preferred Embodiment

[Entire Configuration]

Figure 1:
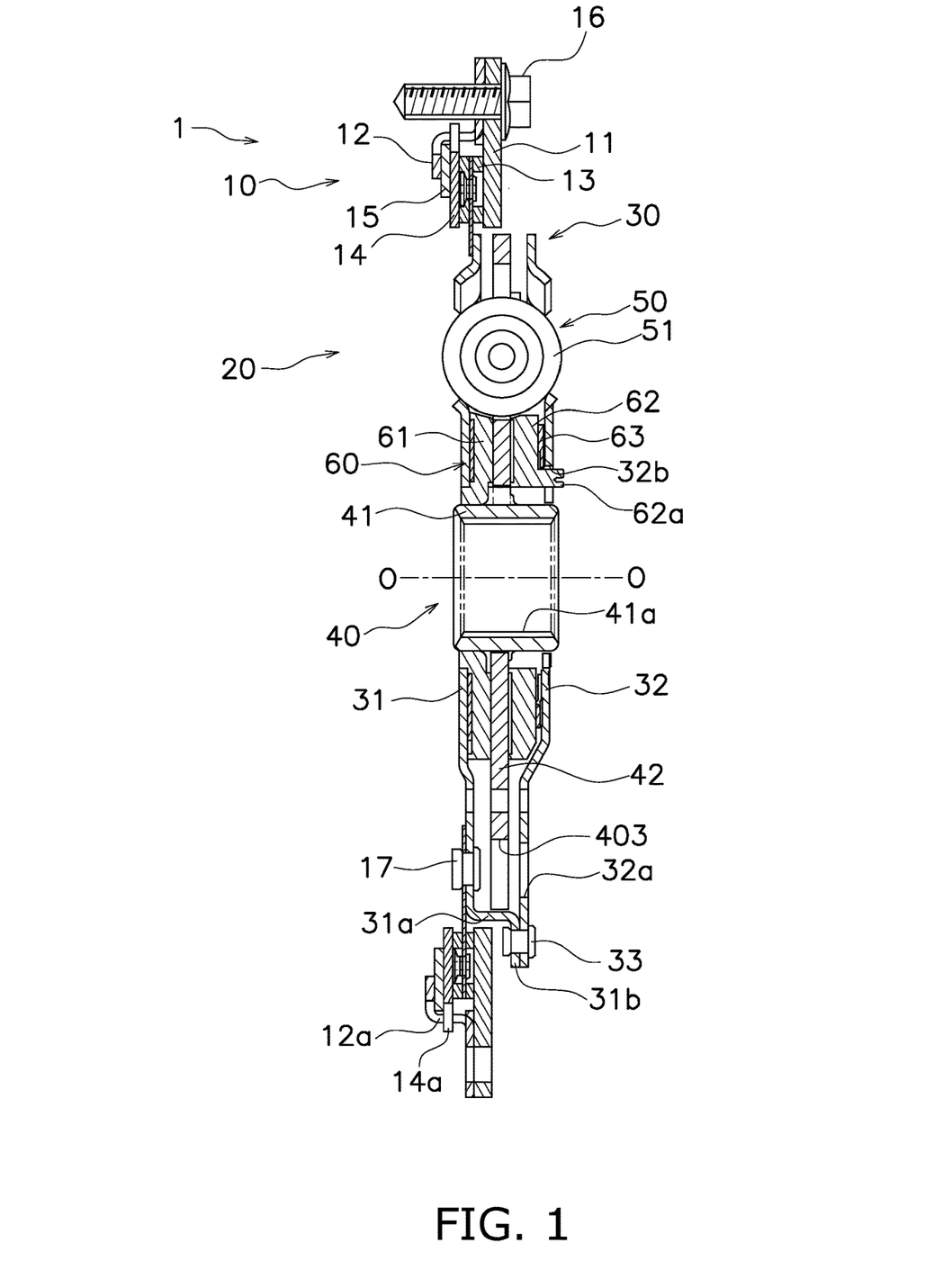
FIG. 1 is a cross-sectional view of a damper device according to a preferred embodiment of the present invention.
Figure 2:
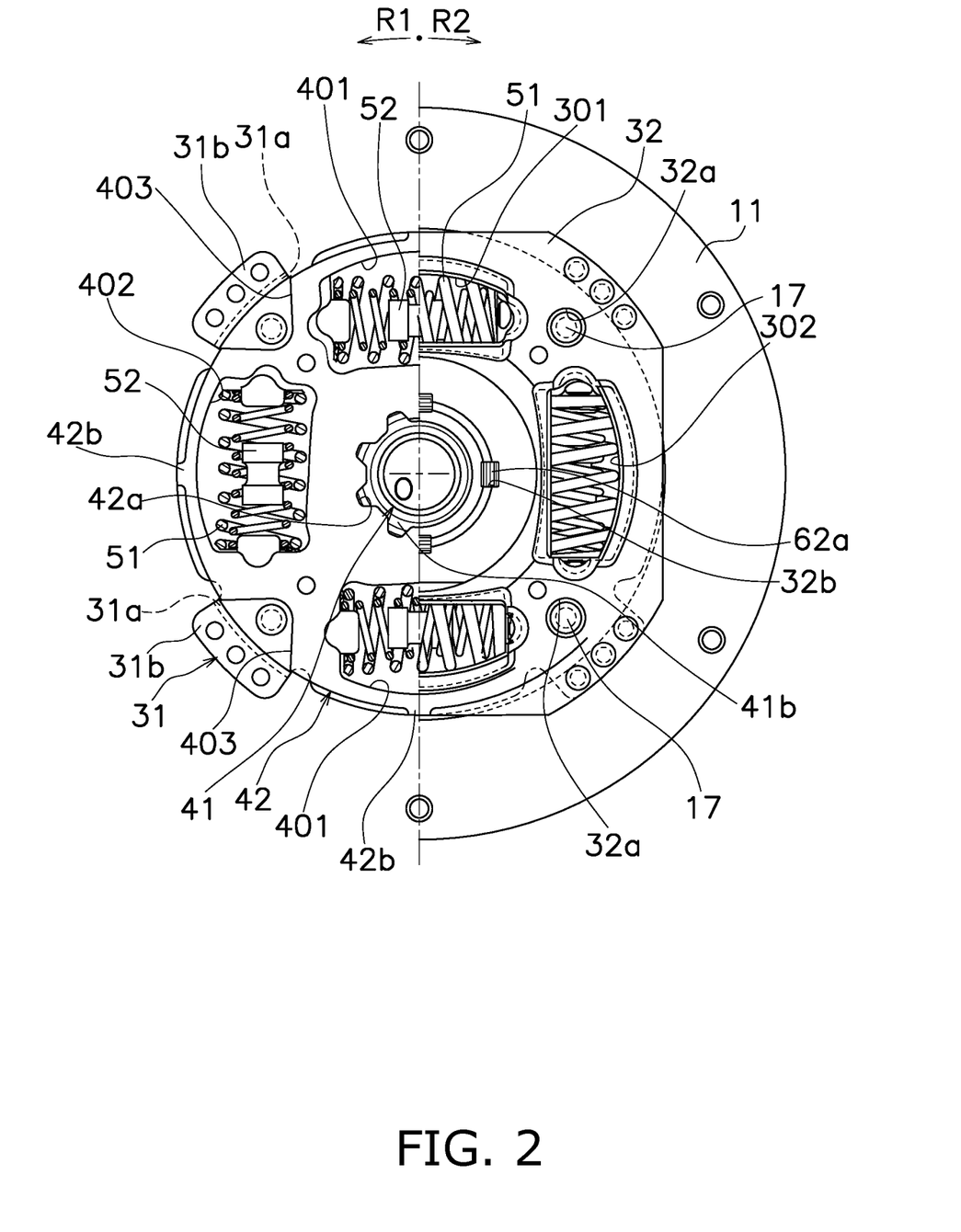
FIG. 2 is a front view of the damper device shown in FIG. 1.

FIG. 1 is a cross-sectional view of a torque limiter embedded damper device 1 (hereinafter simply referred to as "damper device 1") according to a preferred embodiment of the present invention. On the other hand, FIG. 2 is a front view of the damper device 1, from part of which some constituent members are detached. In FIG. 1, an engine (not shown in the drawing) is disposed on the left side of the damper device 1, whereas a drive unit (not shown in the drawing), including an electric motor, a transmission, and so forth, is disposed on the right side of the damper device 1.

It should be noted that in the following explanation, the term "axial direction" refers to an extending direction of a rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O. Likewise, the radial direction is not required to be perfectly matched with a diameter direction of the imaginary circle about the rotational axis O.

The damper device 1 is a device provided between a flywheel (not shown in the drawings) and an input shaft of the drive unit in order to limit a torque transmitted between the engine and the drive unit and attenuate rotational fluctuations. The damper device 1 includes a torque limiter unit 10 and a damper unit 20.

[Torque Limiter Unit 10]

The torque limiter unit 10 is disposed on the outer peripheral side of the damper unit 20. The torque limiter unit 10 limits a torque transmitted between the flywheel and the damper unit 20. The torque limiter unit 10 includes a cover plate 11, a support plate 12, a friction disc 13, a pressure plate 14, and a cone spring 15.

The cover plate 11 and the support plate 12 are disposed at a predetermined interval in the axial direction and are fixed at the outer peripheral parts thereof to the flywheel by a plurality of bolts 16.

The friction disc 13, the pressure plate 14, and the cone spring 15 are disposed axially between the cover plate 11 and the support plate 12.

The friction disc 13 includes a core plate and a pair of friction members fixed to both lateral surfaces of the core plate. The friction disc 13 is herein fixed at the inner peripheral part thereof to the damper unit 20 by a plurality of rivets 17. The pressure plate 14 and the cone spring 15 are disposed between the friction disc 13 and the support plate 12.

The pressure plate 14 has an annular shape and is disposed on the support plate 12 side of the friction disc 13. It should be noted that the pressure plate 14 is provided with a plurality of pawls 14a in the outer peripheral part thereof, and the pawls 14a are engaged with a plurality of engaging holes 12a provided in the support plate 12.

The cone spring 15 is disposed between the pressure plate 14 and the support plate 12. The cone spring 15 presses the friction disc 13 against the cover plate 11 through the pressure plate 14.

[Damper Unit 20]

The damper unit 20 includes an input-side plate 30 (exemplary first rotor), a hub flange 40 (exemplary second rotor), an elastic coupling part 50, and a hysteresis generating mechanism 60.

<Input-Side Plate 30>

The input-side plate 30 includes a first plate 31 and a second plate 32. The first and second plates 31 and 32, each of which is made in shape of a disc including a hole in the center part thereof, are disposed at an interval in the axial direction. The first plate 31 includes four stopper portions 31a and four fixation portions 31b in the outer peripheral part thereof. Besides, the first and second plates 31 and 32 each include a pair of first support portions 301 and a pair of second support portions 302. The first and second support portions 301 and 302 provided in the first plate 31 are identical in position to those provided in the second plate 32.

Furthermore, the first plate 31 is provided with assembling holes 32a in corresponding positions to the rivets 17.

The stopper portions 31a are formed by bending the outer peripheral part of the first plate 31 toward the second plate 32 and extend in the axial direction. The fixation portions 31b are formed by bending the distal ends of the stopper portions 31a radially outward. The fixation portions 31b are fixed to the outer peripheral end of the second plate 32 by a plurality of rivets 33. Because of this, the first and second plates 31 and 32 are non-rotatable relative to each other and are axially immovable from each other.

The pair of first support portions 301 is opposed to each other with respect to the rotational axis O. On the other hand, the pair of second support portions 302 is opposed to each other with respect to the rotational axis O, while being displaced from the pair of first support portions 301 at an angular interval of 90 degrees. Each support portion 301, 302 includes a hole axially penetrating therethrough and an edge part formed by cutting and raising the inner and outer peripheral edges of the hole.

Figure 3A:
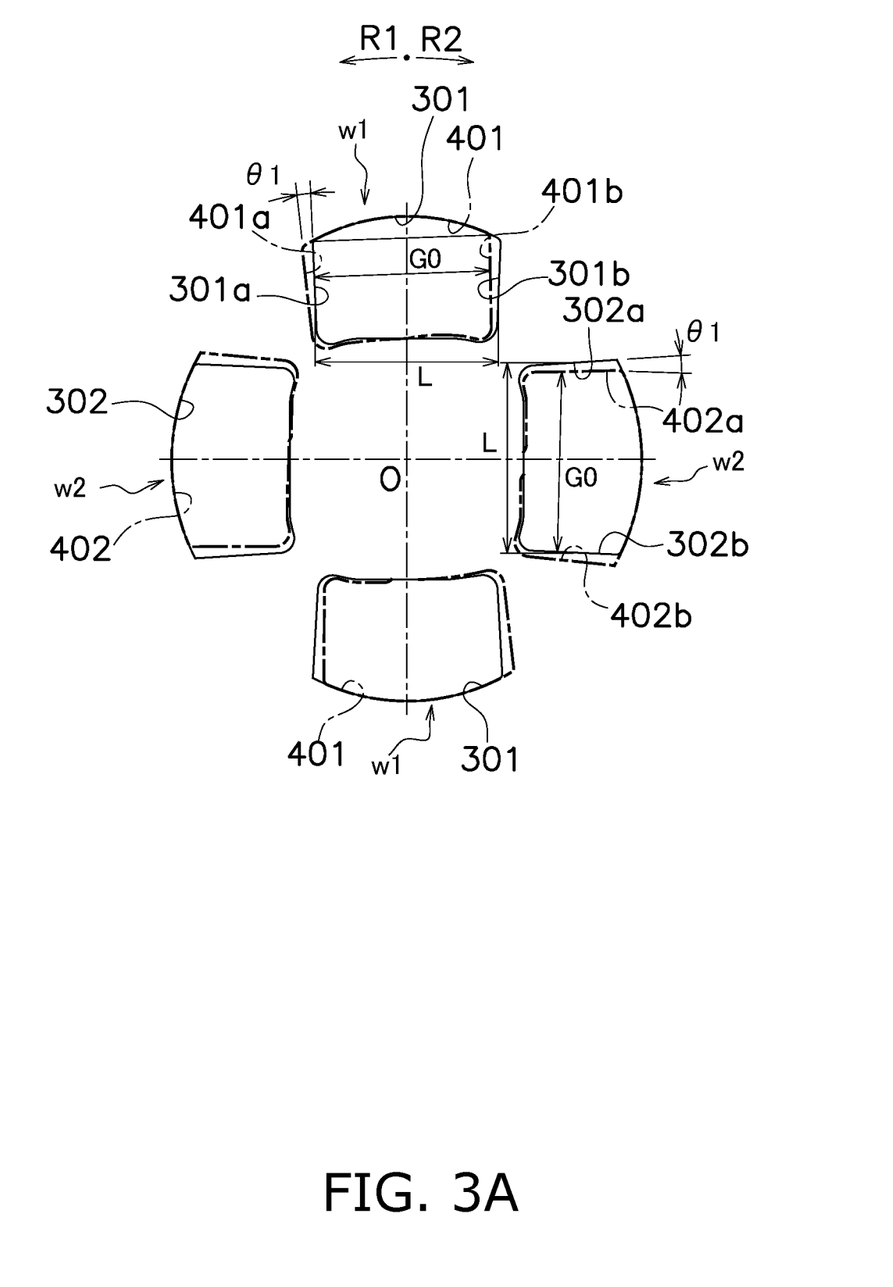
FIG. 3A is a schematic diagram showing a relation between an input-side plate and a hub flange.
Figure 3B:
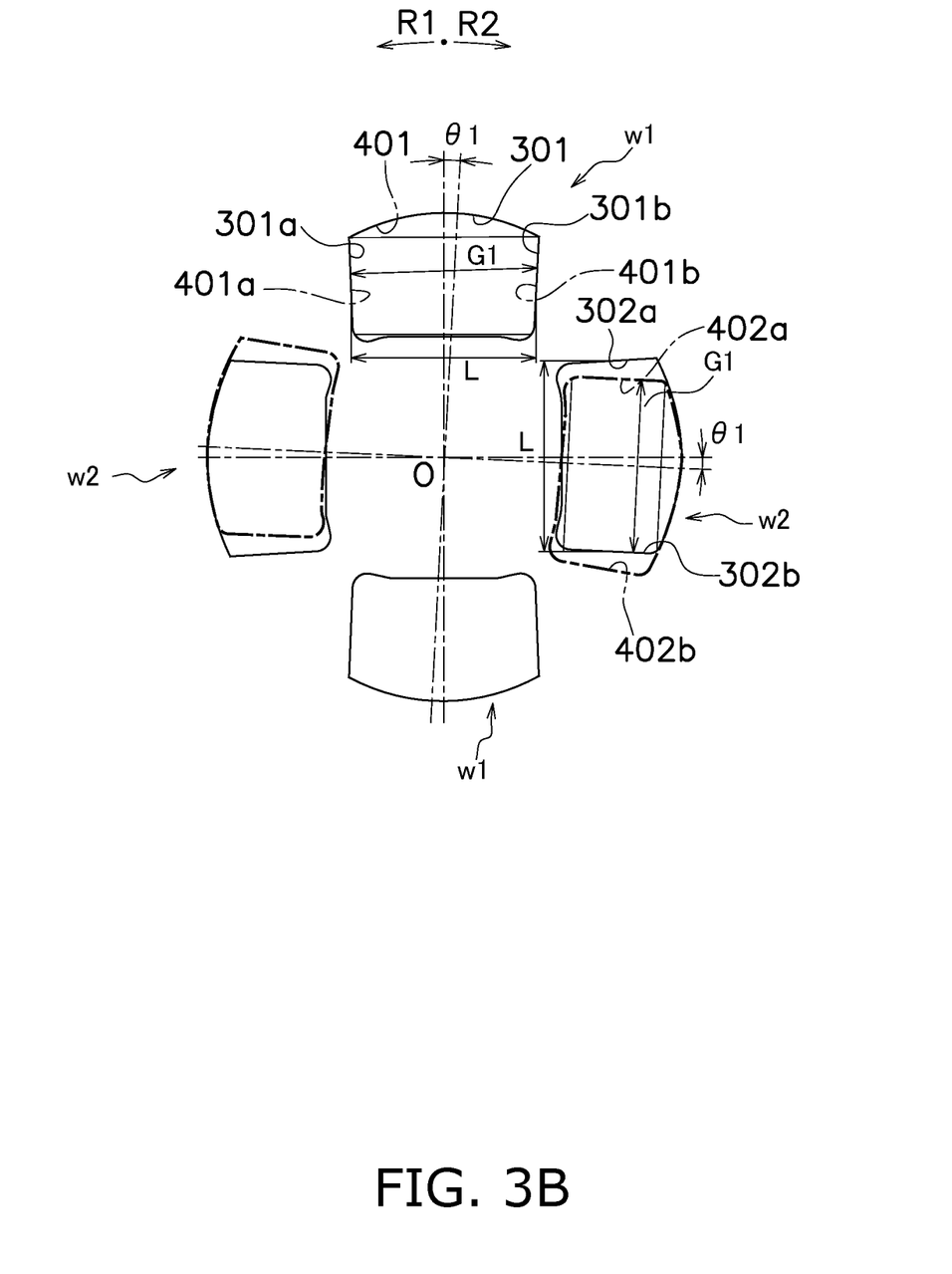
FIG. 3B is a schematic diagram of the relation where the input-side plate and the hub flange are rotated relative to each other by an angle θ1.
Figure 3C:
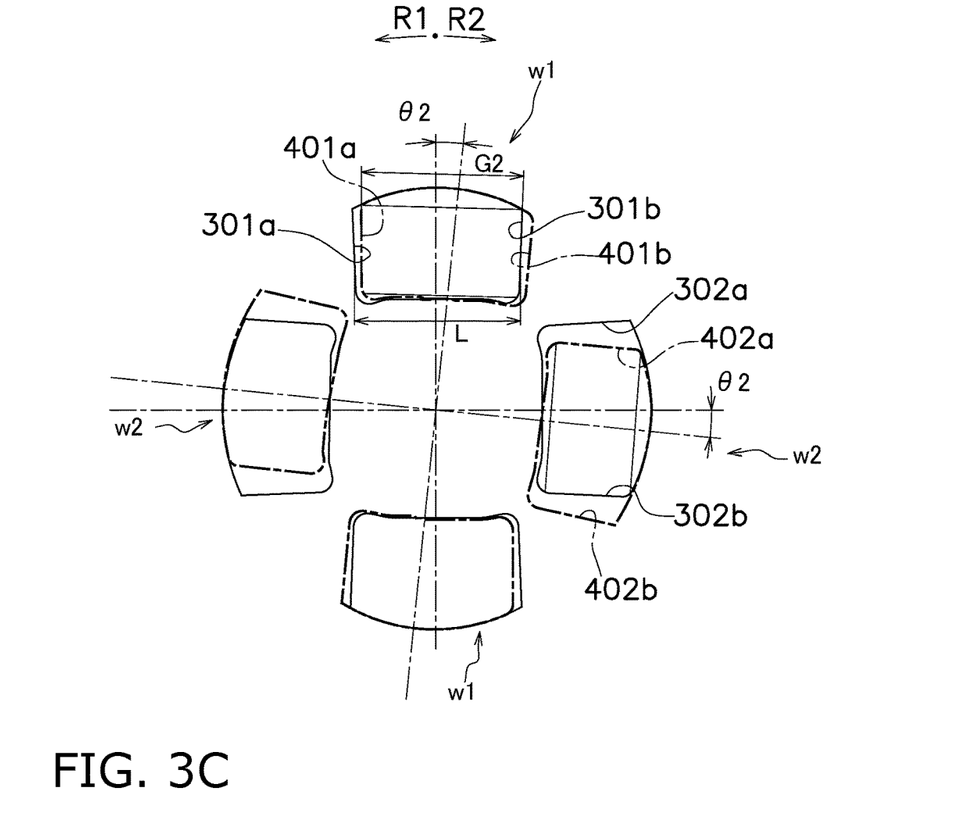
FIG. 3C is a schematic diagram of the relation where the input-side plate and the hub flange are rotated relative to each other by an angle θ2.

As schematically shown in FIGS. 3A to 3C, each support portion 301, 302 includes an R1 support surface 301a, 302a on one end thereof located on a first side in the rotational direction (hereinafter simply referred to as "R1 side") and includes an R2 support surface 301b, 302b on the other end thereof located on a second side in the rotation direction (hereinafter simply referred to as "R2 side"). In each support portion 301, 302, the width of the hole (distance between the R1 and R2 support surfaces) is L. Each support surface 301a, 301b, 302a, 302b slants to open radially outward and the configuration thereof will be described below in detail.

It should be noted that in FIGS. 3A to 3C, the first and second support portions 301 and 302 are depicted with solid line, whereas first and second accommodation portions 401 and 402 (to be described) of the hub flange 40 are depicted with dashed-dotted line. It should be also noted that FIGS. 3A to 3C are schematic diagrams and are therefore different from FIG. 2 in which constituent members are depicted in actual specific shape.

<Hub Flange 40>

As shown in FIGS. 1 and 2, the hub flange 40 includes a hub 41 and a flange 42. The hub flange 40 is rotatable relative to the input-side plate 30 in a predetermined angular range. The hub 41 has a tubular shape and is provided with a spline hole 41a in the center part thereof. Besides, the hub 41 penetrates both holes provided in the center parts of the first and second plates 31 and 32. The flange 42 is made in shape of a disc including a hole in the center part thereof and is disposed radially outside the hub 41. The flange 42 is disposed axially between the first and second plates 31 and 32.

As shown in FIG. 2, the hub 41 is provided with a plurality of external teeth 41b on the outer peripheral surface thereof, whereas the flange 42 is provided with a plurality of internal teeth 42a on the inner peripheral surface thereof so as to be meshed with the external teeth 41b of the hub 41. Therefore, the hub 41 and the flange 42 are unitarily rotated with each other. It should be noted that in the present preferred embodiment, the hub 41 and the flange 42 are provided as separate members, but alternatively, can be provided as a single member.

The flange 42 includes four stopper protrusions 42b, a pair of first accommodation portions 401, a pair of second accommodation portions 402, and four cutouts 403.

The four stopper protrusions 42b are shaped to protrude radially outward from the outer peripheral surface of the flange 42. Each stopper protrusion 42b is provided in a position located radially outside the circumferential middle of each accommodation portion 401, 402. Now, when the input-side plate 30 and the hub flange 40 are rotated relative to each other, the stopper protrusions 42b make contact with the stopper portions 31a of the first plate 31. Accordingly, relative rotation is prevented between the input-side plate 30 and the hub flange 40.

As shown in FIG. 3A, the pair of first accommodation portions 401 is disposed in corresponding positions to the pair of first support portions 301. On the other hand, the pair of second accommodation portions 402 is disposed in corresponding positions to the pair of second support portions 302. When explained in more detail, in a neutral condition (at a torsion angle of 0 degree) that an angle of relative rotation between the input-side plate 30 and the hub flange 40 is 0 degree, and in other words, torsion is not caused between the input-side plate 30 and the hub flange 40, the pair of first accommodation portions 401 is disposed to overlap in part the pair of first support portions 301 and be offset (or displaced) from the pair of first support portions 301 to the R1 side by an angle θ1 (e.g., 2 degrees) as seen in the axial direction. On the other hand, the pair of second accommodation portions 402 is disposed to overlap in part the pair of second support portions 302 and be offset (or displaced) from the pair of second support portions 302 to the R2 side by the angle θ1 as seen in the axial direction.

Each accommodation portion 401, 402 is an approximately rectangular hole that the outer peripheral part thereof is made in shape of a circular arc. As shown in FIG. 3A, each accommodation portion 401, 402 includes an R1 accommodation surface 401a, 402a on one end thereof located on the R1 side and includes an R2 accommodation surface 401b, 402b on the other end thereof located on the R2 side. In each accommodation portion 401, 402, the width of the hole (distance between the R1 accommodation surface 401a, 402a and the R2 accommodation surface 401b, 402b) is set to be L in similar manner to the width of the hole in each support portion 301, 302. Each accommodation surface 401a, 401b, 402a, 402b slants to open radially outward and the configuration thereof will be described in detail.

The four cutouts 403 are each provided circumferentially between adjacent two accommodation portions 401 and 402 and are recessed radially inward from the outer peripheral surface of the flange 42 at a predetermined depth. The cutouts 403 are provided in corresponding positions to the rivets 17 by which the first plate 31 and the friction disc 13 of the torque limiter unit 10 are coupled to each other. Therefore, the torque limiter unit 10 and the damper unit 20, assembled in different steps, can be fixed to each other by the rivets 17 with use of the assembling holes 32a of the second plate 32 and the cutouts 403 of the flange 42.

<Elastic Coupling Part 50>

The elastic coupling part 50 includes four coil springs 51 (exemplary first and second elastic members) and four resin members 52. Each coil spring 51 is composed of an outer spring and an inner spring. The four coil springs 51 are accommodated in the accommodation portions 401 and 402 of the flange 42, respectively, while being supported in both radial and axial directions by the support portions 301 and 302 of the input-side plate 30, respectively. The coil springs 51 are actuated in parallel.

Incidentally, the four coil springs 51 are equal in free length (Sf). The free length Sf of each coil spring 51 is equal to the width L of each of each support portion 301, 302 and each accommodation portion 401, 402. Besides, the four coil springs 51 are equal in stiffness. Likewise, the four resin members 52 are equal in stiffness.

<Accommodation States of Coil Springs 51>

Now, a layout of the support portions 301 and 302 and the accommodation portions 401 and 402 and an accommodation state of each coil spring 51, which are made in the neutral condition, will be hereinafter explained in detail. It should be noted that in the following explanation, on an as-needed basis, a set of the first support portion 301 and the first accommodation portion 401 will be referred to as "first window set w1", whereas a set of the second support portion 302 and the second accommodation portion 402 will be referred to as "second window set w2".

As described above, in the neutral condition as shown in FIG. 3A, each of the pair of first accommodation portions 401 is offset from corresponding one of the pair of first support portions 301 to the R1 side by the angle θ1. On the other hand, each of the pair of second accommodation portions 402 is offset from corresponding one of the pair of the second support portions 302 to the R2 side by the angle θ1. Besides, each coil spring 51 is attached in a compressed state to an opening (axially penetrating hole) formed by axial overlap between each support portion 301, 302 and each corresponding accommodation portion 401, 402.

Specifically, in the neutral condition as shown in FIG. 3A, in each of the pair of first window sets w1, the coil spring 51 makes contact at the R1-side end surface thereof with the R1 support surface 301a, while making contact at the R2-side end surface thereof with the R2 accommodation surface 401b. On the other hand, in each of the pair of second window sets w2, the coil spring 51 makes contact at the R1-side end surface thereof with the R1 accommodation surface 402a, while making contact at the R2-side end surface thereof with the R2 support surface 302b.

<One-Side Contact and Both-Side Contact of Coil Spring 51>

Figure 4:
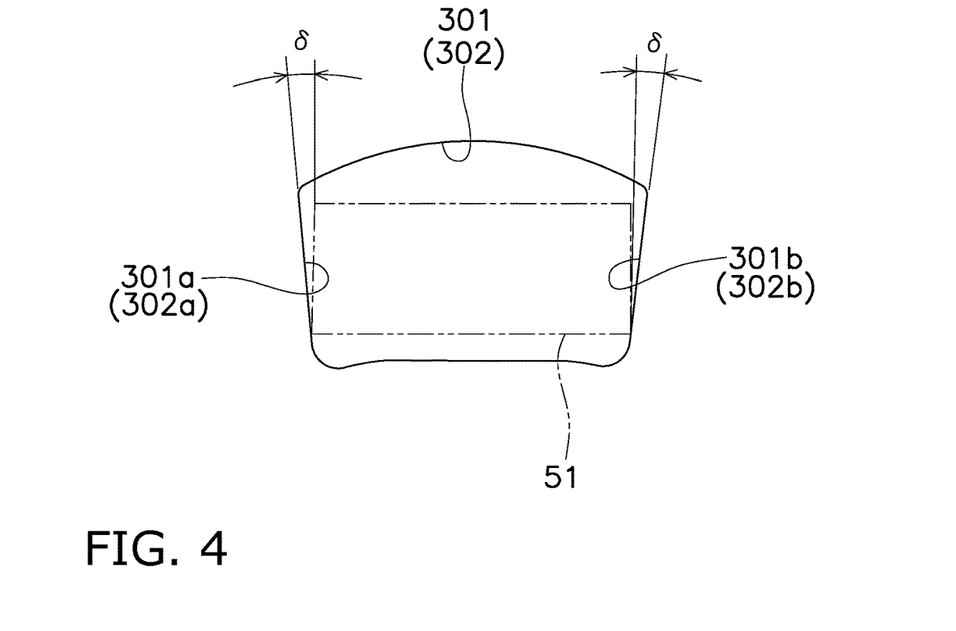
FIG. 4 is an enlarged schematic diagram of a support portion (accommodation portion).

Now, FIG. 4 shows closeup each support portion 301, 302. It should be noted that FIG. 4 is a schematic diagram and is different in shape and dimension of each support portion 301, 302 from an actual configuration. As shown in FIG. 4, the support surfaces 301a and 301b, 302a and 302b of each support portion 301, 302 slant by an angle δ (e.g., 3 degrees) to open from radially inside to radially outside. Therefore, when disposed in each support portion 301, 302 without any gap in the rotational direction, the coil spring 51 makes contact at both end surfaces thereof with the support surfaces 301a and 301b, 302a and 302b in an uncompressed state, while each end surface thereof makes contact only at a radially inner part thereof with each support surface 301a, 301b, 302a, 302b (this state will be referred to as "one-side contact state"). When the coil spring 51 is then compressed by a predetermined amount, at this time and thereafter, each end surface of the coil spring 51 makes contact at both radially inner and outer parts thereof with each support surface 301a, 301b, 302a, 302b (this state will be referred to as "both-side contact state").

Likewise, the accommodation surfaces 401a and 401b, 402a and 402b of each accommodation portion 401, 402 also slant by the angle δ, although this configuration is not shown in the drawings.

Figure 5:
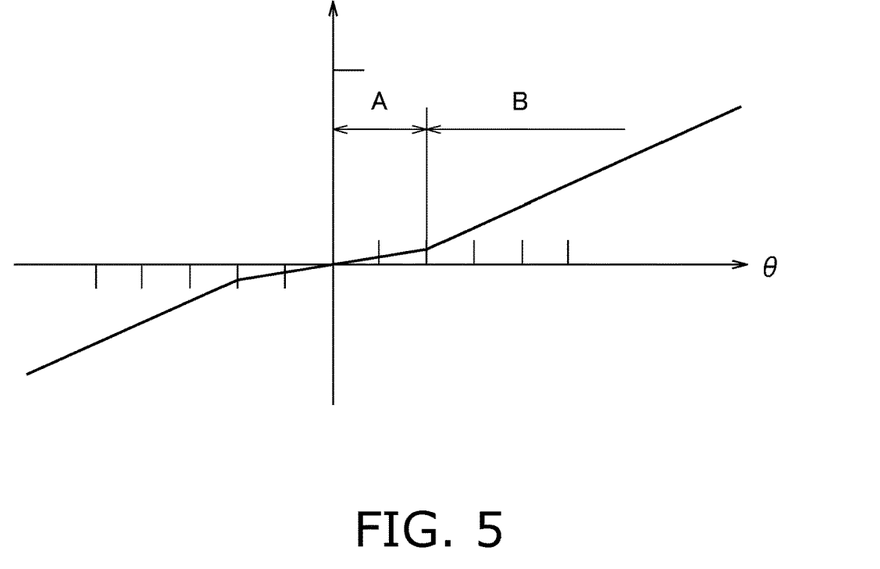
FIG. 5 is a chart showing torsional characteristics in a one-side contact state and a both-side contact state.

As described above, by making each support surface 301a, 301b, 302a, 302b and each accommodation surface 401a, 401b, 402a, 402b slant to open radially outward, torsional characteristics of the coil spring 51 disposed in each of each support portion 301, 302 and each accommodation portion 401, 402 are obtained as shown in FIG. 5. In other words, a characteristic with low stiffness is exerted in a torsion angular range A that the coil spring 51 is compressed in the one-side contact state, whereas a characteristic with high stiffness is exerted in a torsion angular range B that the coil spring 51 is compressed in the both-side contact state.

It should be noted that FIG. 5 shows torsional characteristics where each support portion 301, 302 and each accommodation portion 401, 402 are not offset in the rotational direction.

<Hysteresis Generating Mechanism 60>

As shown in FIG. 1, the hysteresis generating mechanism 60 includes a first bushing 61, a second bushing 62, and a cone spring 63. The first bushing 61 is disposed axially between the first plate 31 and the flange 42. The first bushing 61 is provided with a friction member fixed to a surface thereof making frictional contact with the first plate 31. The second bushing 62 is disposed axially between the second plate 32 and the flange 42. The second bushing 62 is provided with a friction member fixed to one surface thereof making frictional contact with the flange 42. Besides, the second bushing 62 is provided with a plurality of engaging protrusions 62a axially protruding from the other surface thereof located on the second plate 32 side. The engaging protrusions 62a are engaged with a plurality of engaging holes 32b of the second plate 32, respectively. The cone spring 63 is disposed axially between the second bushing 62 and the second plate 32, while being compressed therebetween.

With the configuration described above, the first bushing 61 is pressed against the first plate 31, while the second bushing 62 is pressed against the flange 42. Therefore, when the input-side plate 30 and the hub flange 40 are rotated relative to each other, a hysteresis torque is generated between the pressing member 61, 62 and the pressed member 31, 42.

[Actions]

It should be noted that the hysteresis torque is not considered in the following explanation of actions and the charts showing torsional characteristics. Besides, the torsional characteristics will be explained only for the neutral condition and a condition that torsion is caused to the positive side from the neutral condition.

As described above, in the present preferred embodiment, the support surfaces of each support portion 301, 302 and the accommodation surfaces of each accommodation portion 401, 402 are shaped to open radially outward. Therefore, in each window set w1, w2, the coil spring 51 transitions from the one-side contact state to the both-side contact state when actuated in compression. In the following explanation, in each window set w1, w2, torsional stiffness due to the one-side contact state will be defined as k1, whereas torsional stiffness due to the both-side contact state will be defined as k2. Besides, a condition where offset is caused by an angle of 2 degrees will be exemplified in the following explanation.

<Neutral Condition>

In the neutral condition without relative rotation between the input-side plate 30 and the hub flange 40, as shown in FIG. 3A, the coil spring 51 in each first window set w1 is disposed between the R1 support surface 301a and the R2 accommodation surface 401b. The interval between the R1 support surface 301a and the R2 accommodation surface 401b is G0 and is narrower than the width L (equal to the free length Sf of the coil spring 51) in each of each support portions 301, 302 and each accommodation portion 401, 402. Therefore, in each first window set w1, the coil spring 51 is disposed in the compressed state. Because of this, as depicted with broken line in FIG. 6, in each first window set w1, a torsional torque −t is generated by the compressed coil spring 51.

Likewise, in the neutral condition, the coil spring 51 in each second window set w2 is disposed between the R1 accommodation surface 402a and the R2 support surface 302b. The interval between the R1 accommodation surface 402a and the R2 support surface 302b is G0 and is narrower than the width L (equal to the free length Sf of the coil spring 51) in each of each support portion 301, 302 and each accommodation portion 401, 402. Therefore, in each second window set w2, the coil spring 51 is disposed in the compressed state. Because of this, as depicted with dashed two-dotted line in FIG. 6, in each second window set w2, a torsional torque +t is generated by the compressed coil spring 51.

<Actuation in First Window Set w1>

Figure 6:
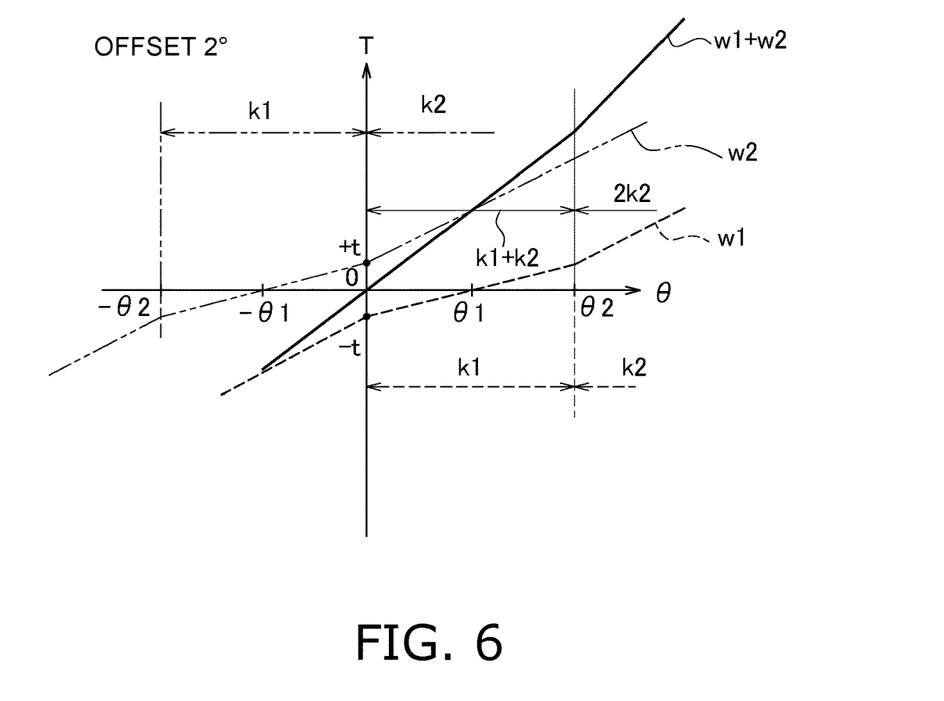
FIG. 6 is a chart showing torsional characteristics in a first preferred embodiment of the present invention.

When offset is caused by an angle of 2 degrees, as depicted with broken line in FIG. 6, the coil spring 51 in each first window set w1 is actuated in the one-side contact state (stiffness k1) in a torsion angular range from 0 degree via θ1 to θ2 (compression→free-length state→compression) and is then compressed in the both-side contact state (stiffness k2) at a greater torsion angle than θ2. The actuation in each first window set w1 will be hereinafter explained in more detail.

FIG. 3B shows a condition that a torque inputted to the damper unit 20 fluctuates and torsion of the hub flange 40 with respect to the input-side plate 30 is caused from the neutral condition to the R2 side by the angle θ1. Here, in each first window set w1, the interval between the R1 support surface 301a making contact with the R1-side end surface of the coil spring 51 and the R2 accommodation surface 401b making contact with the R2-side end surface of the coil spring 51 is G1 and becomes wider than the interval G0. The interval G1 is equal in magnitude to the free length Sf of the coil spring 51. In other words, when the torsion angle between the input-side plate 30 and the hub flange 40 reaches +θ1, the coil spring 51 in each first window set w1 becomes a free-length-Sf state, whereby the torsional torque generated by the coil spring 51 becomes "0" as shown in FIG. 6.

As described above, in a torsion angular range of 0 to θ1, the coil spring 51 in each first window set w1 transitions from the compressed state to the free-length state, while being actuated in the one-side contact state. Therefore, k1 is obtained as the torsional stiffness.

Next, when torsion of the hub flange 40 with respect to the input-side plate 30 is caused at a greater torsion angle than θ1, as shown in FIG. 3C (in which a condition made at a torsion angle θ2 (>θ1) is shown), the coil spring 51 in each first window set w1 makes contact at the R1-side end surface thereof with the R1 accommodation surface 401a, while making contact at the R2-side end surface thereof with the R2 support surface 301b. Besides, the coil spring 51 becomes the both-side contact state at the torsion angle θ2. Here, the interval between the R1 accommodation surface 401a and the R2 support surface 301b is G2 and becomes narrower than the free length Sf of the coil spring 51. In other words, when the torsion angle between the input-side plate 30 and the hub flange 40 becomes greater than θ1, the coil spring 51 is compressed from the free-length-Sf state, whereby the torsional torque gradually increases as depicted with broken line in FIG. 6.

As described above, in the torsion angular range of greater than θ1, the coil spring 51 in each first window set w1 is compressed from the free-length state and is then compressed in the both-side contact state when the torsion angle reaches θ2. Therefore, k2 is obtained as the torsional stiffness.

<Actuation in Second Window Set w2>

When offset is caused by 2 degrees, as depicted with dashed two-dotted line in FIG. 6, the coil spring 51 in each second window set w2 is actuated in the one-side contact state (stiffness k1) in a torsion angular range from −θ2 via −θ1 to 0 (compression→free-length state→compression) and is then compressed in the both-side contact state (stiffness k2) at a greater torsion angle than 0 (compression→compression). The actuation in each second window set w2 will be hereinafter explained in more detail.

When torsion of the hub flange 40 with respect to the input-side plate 30 is caused from the neutral condition to the R2 side, the coil spring 51 in each second window set w2 is constantly compressed between the R1 accommodation surface 402a and the R2 support surface 302b. In other words, in each second window set w2, the torsional torque gradually increases with increase in torsion angle as depicted with dashed two-dotted line in FIG. 6.

Here, the coil spring 51 is further compressed from the compressed state, while being compressed in the both-side contact state. Therefore, k2 is obtained as the torsional stiffness.

<Net Torsional Characteristics>

As is obvious from the above, torsional characteristics depicted with solid line in FIG. 6 represent net torsional characteristics obtained by adding a torsional characteristic of each first window set w1 and that of each second window set w2. In other words, stiffness is obtained as follows in respective torsion angular ranges.

Torsion angular range of 0 to θ2: k1+k2

Torsion angular range of θ2 and greater: 2k2

As described above, two-stage torsional characteristics can be easily obtained by the layout of offset between each support portion 301, 302 and each corresponding accommodation portion 401, 402 and by shaping each support surface 301a, 301b, 302a, 302b and each accommodation surface 401a, 401b, 402a, 402b to open radially outward.

Here, in the torsional characteristics of the entire damper unit, apparent torsional torque is "0" in the neutral condition. However, the positive-side torsional torque and the negative-side torsional torque act on the input-side member and the output-side member. Therefore, when torque fluctuations occur in a range of +t to −t, the torsion angle between the input-side plate 30 and the hub flange 40 falls in a range of −θ1 to +θ1, and the coil spring 51 in each first window set w1 does not make contact at the end surfaces thereof with the R1 accommodation surface 401a and the R2 support surface 301b. On the other hand, the coil spring 51 in each second window set w2 does not make contact at the end surfaces thereof with the R1 support surface 302a and the R2 accommodation surface 402b. Because of this, it is possible to inhibit collision sound produced between respective members due to torque fluctuations when torque fluctuations occur in the range of +t to −t.

On the other hand, when the torsion angle is ±θ1, the coil spring 51 in each first window set w1 or each second window set w2 becomes the free-length state. This configuration can further inhibit collision sound produced between respective members than a configuration that all the coil springs 51 are set in the free-length state.

It should be noted that when the torsion angle further increases, the resin member 52 in each window set w1, w2 is compressed, and higher stiffness than k2 is obtained in the torsional characteristics. Then, when the torsion angle further increases, the stopper protrusions 42b of the flange 42 make contact with the stopper portions 31a of the first plate 31, whereby the input-side plate 30 and the hub flange 40 are prevented from rotating relative to each other.

Second Preferred Embodiment

Figure 7:
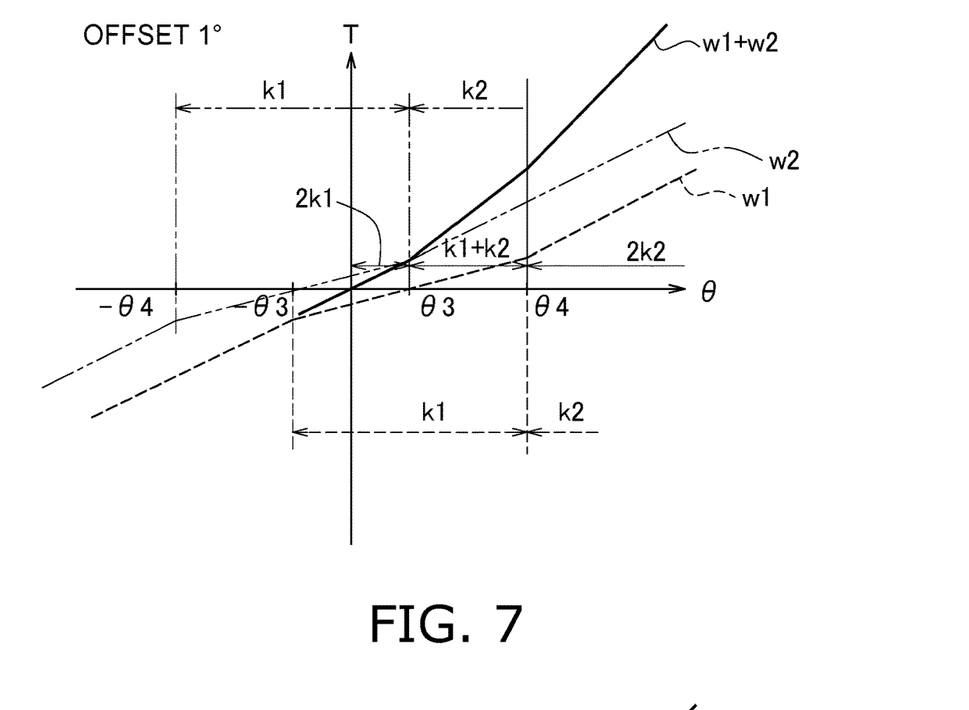
FIG. 7 is a chart showing torsional characteristics in a second preferred embodiment of the present invention.

FIG. 7 shows torsional characteristics where offset is caused between each support portion 301, 302 and each corresponding accommodation portion 401, 402 by an angle of 1 degree (an exemplary offset amount smaller than the offset amount in the first preferred embodiment).

The offset amount is herein smaller than that in the first preferred embodiment. Hence, characteristics of each first window set w1 are displaced to the negative side from those in the first preferred embodiment. In other words, as depicted with broken line in FIG. 7, the coil spring 51 is actuated in the one-side contact state (stiffness k1) in a torsion angular range of −θ3 to θ4 (compression→free-length state→compression) and is then compressed in the both-side contact state (stiffness k2) at a greater angle than θ4.

On the other hand, characteristics of each second window set w2 are displaced to the positive side from those in the first preferred embodiment and are thus opposite in displacement direction to the characteristics of each first window set w1. In other words, as depicted with dashed two-dotted line in FIG. 7, the coil spring 51 is compressed in the one-side contact state (stiffness k1) in a torsion angular range of −θ4 to θ3 (compression→free-length state→compression) and is then compressed in the both-side contact state (stiffness k2) at a greater angle than θ3 (compression→compression).

As is obvious from the above, the actuation of each coil spring 51 is basically the same as that in the first preferred embodiment but is different therefrom only in timing of transition from the free-length state to compression.

In FIG. 7, torsional characteristics depicted with solid line represent net torsional characteristics in the second preferred embodiment. In other words, stiffness is obtained as follows in respective torsion angular ranges.

Torsion angular range of 0 to θ3: 2k1
Torsion angular range of θ3 to θ4: k1+k2
Torsion angular range of θ4 and greater: 2k2.

Therefore, three-stage torsional characteristics can be easily obtained in the second preferred embodiment.

Third Preferred Embodiment

Figure 8:
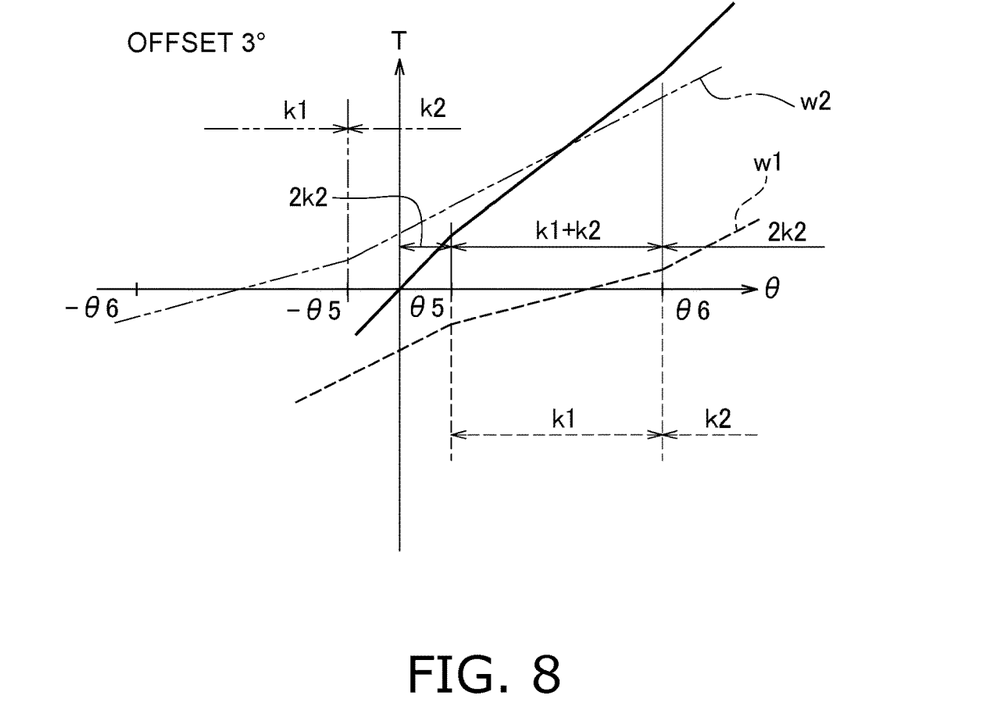
FIG. 8 is a chart showing torsional characteristics in a third preferred embodiment of the present invention.

FIG. 8 shows torsional characteristics where offset is caused between each support portion 301, 302 and each corresponding accommodation portion 401, 402 by an angle of 3 degrees (an exemplary offset amount larger than the offset amount in the first preferred embodiment).

The offset amount is herein larger than that in the first preferred embodiment. Hence, characteristics of each first window set w1 are displaced to the positive side from those in the first preferred embodiment. In other words, as depicted with broken line in FIG. 8, the coil spring 51 is compressed in the both-side contact state (stiffness k2) in a torsion angular range of 0 to θ5 (compression). The coil spring 51 is then actuated in the one-side contact state (stiffness k1) in a torsion angular range of θ5 to θ6 (compression→free-length state→compression). Subsequently, the coil spring 51 is compressed in the both-side contact state (stiffness k2) at a greater angle than θ6.

On the other hand, characteristics of each second window set w2 are displaced to the negative side from those in the first preferred embodiment and are thus opposite in displacement direction to the characteristics of each first window set w1. In other words, as depicted with dashed two-dotted line in FIG. 8, the coil spring 51 is actuated in the one-side contact state (stiffness k1) in a torsion angular range of −θ6 to −θ5 (compression→free-length state→compression) and is then compressed in the both-side contact state (stiffness k2) at a greater angle than −θ5.

As is obvious from the above, the action in compression of each coil spring 51 is basically the same as that in the first preferred embodiment but is different therefrom only in timing of transition from the free-length state to compression.

In FIG. 8, torsional characteristics depicted with solid line represent net torsional characteristics in the third preferred embodiment. In other words, stiffness is obtained as follows in respective torsion angular ranges:

Torsion angular range of 0 to θ5: 2k2
Torsion angular range of θ5 to θ6: k1+k2
Torsion angular range of θ6 and greater: 2k2

Therefore, as achieved in the second preferred embodiment, three-stage torsional characteristics can be easily obtained in the third preferred embodiment as well.

Other Preferred Embodiments

The present invention is not limited to the preferred embodiments described above, and a variety of changes or modifications can be made without departing from the scope of the present invention.

(a) A relation between the width of each of each support portion 301, 302 and each accommodation portion 401, 402 and the free length of each coil spring 51 is not limited to that in each of the preferred embodiments described above.

(b) In each of the preferred embodiments described above, all the coil springs are set to be equal in stiffness. However, coil springs herein used can be different in stiffness from each other.

(c) The number of accommodation portions, that of support portions, and that of coil springs are exemplary only and are not limited to those in each of the preferred embodiments described above.

(d) In each of the preferred embodiments described above, both each support surface and each accommodation surface are shaped to slant to open radially outward. However, only either each support surface or each accommodation surface can be shaped to slant.

REFERENCE SIGNS LIST

1 Damper device
30 Input-side plate (first rotor)
301 First support portion
302 Second support portion
301a, 302a R1 support surface
301b, 302b R2 support surface
40 Hub flange (second rotor)
401 First accommodation portion
402 Second accommodation portion
401a, 402a R1 accommodation surface
401b, 402b R2 accommodation surface
50 Elastic coupling part
51 Coil spring (first elastic member, second elastic member)

What is claimed is:

1. A damper device comprising:
   a first rotor rotated about a rotational axis;
   a second rotor rotated about the rotational axis, the second rotor disposed to be rotatable relative to the first rotor; and
   an elastic coupling part configured to elastically couple the first rotor and the second rotor in a rotational direction, the elastic coupling part including a first elastic member and a second elastic member, the first and second elastic members each initially disposed in a respective initial compressed state in a neutral condition without torsion caused by relative rotation between the first rotor and the second rotor, wherein
   the elastic coupling part is configured such that the first elastic member transitions from its initial compressed state to a free state and then is recompressed when the torsion of the first rotor with respect to the second rotor is caused from the neutral condition to a first side in the rotational direction,
   the elastic coupling part is configured such that the second elastic member transitions from its initial compressed state to a free state and then is recompressed when the torsion of the first rotor with respect to the second rotor is caused from the neutral condition to a second side in the rotational direction, and
   the elastic coupling part is configured such that each of the first and second elastic members is able to transition from a one-side contact state in which only a radially inner side of the elastic member is compressed to a both-side contact state in which both the radially inner side and a radially outer side of the elastic member are compressed with increasing torsion angle between the first and second rotors.

2. The damper device according to claim 1, wherein
   the elastic coupling part is configured such that the first elastic member is further compressed from its initial compressed state when the torsion of the first rotor with respect to the second rotor is caused from the neutral condition to the second side in the rotational direction, and
   the elastic coupling part is configured such that the second elastic member is further compressed from its initial compressed state when the torsion of the first rotor with respect to the second rotor is caused from the neutral condition to the first side in the rotational direction.

3. The damper device according to claim 1, wherein the first and second elastic members are equal in stiffness.

4. The damper device according to claim 1, wherein
   the elastic coupling part includes a first support portion and a second support portion in the first rotor,
   the elastic coupling part includes a first accommodation portion and a second accommodation portion in the second rotor, the first accommodation portion disposed to overlap in part the first support portion and be offset from the first support portion to the first side in the rotational direction in the neutral condition as seen in an axial direction, the second accommodation portion disposed to overlap in part the second support portion and be offset from the second support portion to the second side in the rotational direction in the neutral condition as seen in the axial direction,
   the first elastic member is disposed in the first support portion and the first accommodation portion, and
   the second elastic member is disposed in the second support portion and the second accommodation portion, the second elastic member actuated in parallel with the first elastic member.

5. The damper device according to claim 4, wherein
   the first and second support portions each include a first support surface on one end thereof located on the first side in the rotational direction, and the first and second support portions each include a second support surface on another end thereof located on the second side in the rotational direction,
   the first and second accommodation portions each include a first accommodation surface on one end thereof located on the first side in the rotational direction, and the first and second accommodation portions each include a second accommodation surface on another end thereof located on the second side in the rotational direction,
   the first elastic member is disposed in its initial compressed state between the first support surface and the second accommodation surface,
   the second elastic member is disposed in its initial compressed state between the first accommodation surface and the second support surface, and
   at least one of the first support surface and the first accommodation surface and at least one of the second support surface and the second accommodation surface slant to open radially outward.

6. The damper device according to claim 4, wherein
   the first accommodation portion is disposed to be offset from the first support portion to the first side in the rotational direction in the neutral condition by a predetermined angle, and the second accommodation portion is disposed to be offset from the second support portion to the second side in the rotational direction in the neutral condition by the predetermined angle,
   the first and second elastic members are each in the one-side contact state in a first torsion angular range,
   the first elastic member is in the one-side contact state and the second elastic member is in the both-side contact state in a second torsion angular range greater than the first torsion angular range, and
   the first and second elastic members are each in the both-side contact state in a third torsion angular range exceeding the second torsion angular range.

7. The damper device according to claim 4, wherein
   the first accommodation portion is disposed to be offset from the first support portion to the first side in the rotational direction in the neutral condition by a predetermined angle, and the second accommodation portion is disposed to be offset from the second support portion to the second side in the rotational direction in the neutral condition by the predetermined angle,
   the first elastic member is in the one-side contact state and the second elastic member is in the both-side contact state in a first torsion angular range, and
   the first and second elastic members are each in the both-side contact state in a second torsion angular range exceeding the first torsion angular range.

8. The damper device according to claim 4, wherein
   the first accommodation portion is disposed to be offset from the first support portion to the first side in the rotational direction in the neutral condition by a predetermined angle, and the second accommodation portion is disposed to be offset from the second support portion to the second side in the rotational direction in the neutral condition by the predetermined angle,
   the first and second elastic members are each in the both-side contact state in a first torsion angular range, the first elastic member is in the one-side contact state and the second elastic member is in the both-side contact state in a second torsion angular range greater than the first torsion angular range, and the first and second elastic members are each in the both-side contact state in a third torsion angular range exceeding the second torsion angular range.

9. The damper device according to claim 1, wherein
the elastic coupling part further includes a third elastic member and a fourth elastic member, the third and fourth elastic members each initially disposed in a compressed state in the neutral condition, the third elastic member is configured to be transitioned from the compressed state to a free state and then be recompressed when the torsion of the first rotor with respect to the second rotor is caused from the neutral condition to the first side in the rotational direction, and the fourth elastic member is configured to be transitioned from the compressed state to a free state and then be recompressed when the torsion of the first rotor with respect to the second rotor is caused from the neutral condition to the second side in the rotational direction.

10. The damper device according to claim 9, wherein
the elastic coupling part further includes a third support portion and a fourth support portion in the first rotor, the third support portion opposed to the first support portion with respect to the rotational axis, the fourth support portion opposed to the second support portion with respect to the rotational axis, the elastic coupling part further includes a third accommodation portion and a fourth accommodation portion in the second rotor, the third accommodation portion opposed to the first accommodation portion with respect to the rotational axis, the fourth accommodation portion opposed to the second accommodation portion with respect to the rotational axis, the third accommodation portion is disposed to overlap in part the third support portion and be offset from the third support portion to the first side in the rotational direction in the neutral condition as seen in the axial direction, the fourth accommodation portion is disposed to overlap in part the fourth support portion and be offset from the fourth support portion to the second side in the rotational direction in the neutral condition as seen in the axial direction, the third elastic member is disposed in the third support portion and the third accommodation portion, and the fourth elastic member is disposed in the fourth support portion and the fourth accommodation portion, the fourth elastic member actuated in parallel with the third elastic member.

11. The damper device according to claim 10, wherein
the third and fourth support portions each include a third support surface on one end thereof located on the first side in the rotational direction, and the third and fourth support portions each include a fourth support surface on another end thereof located on the second side in the rotational direction, the third and fourth accommodation portions each include a third accommodation surface on one end thereof located on the first side in the rotational direction, and the third and fourth accommodation portions each include a fourth accommodation surface on another end thereof located on the second side in the rotational direction, the third elastic member is disposed in its initial compressed state between the third support surface and the fourth accommodation surface, the fourth elastic member is disposed in its initial compressed state between the third accommodation surface and the fourth support surface, and at least one of the third support surface and the third accommodation surface and at least one of the fourth support surface and the fourth accommodation surface slant to open radially outward.

* * * * *